J. C. TEAGUE.
Shovel Plow.
No. 29,924. Patented Sept. 4, 1860.
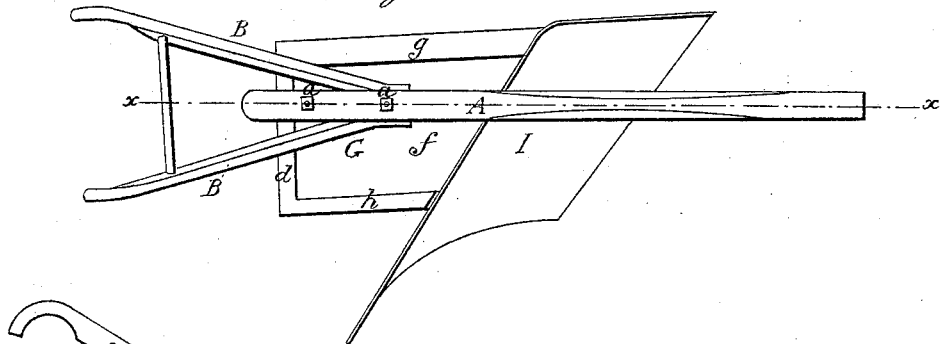
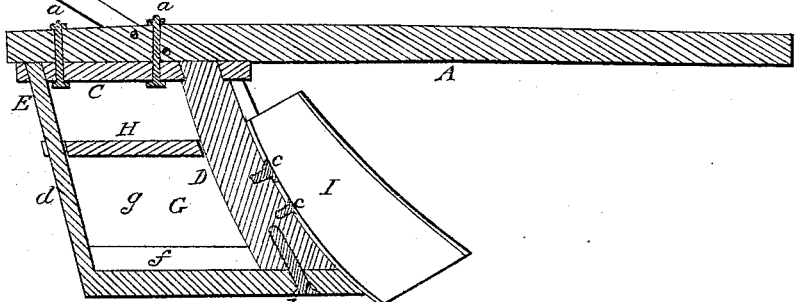
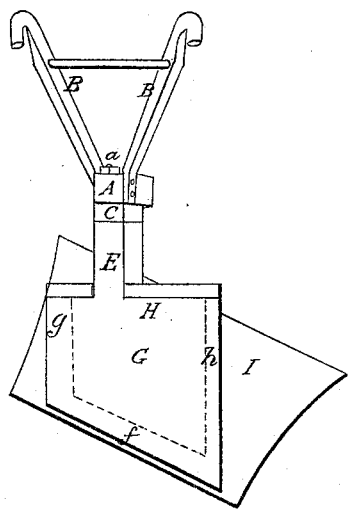
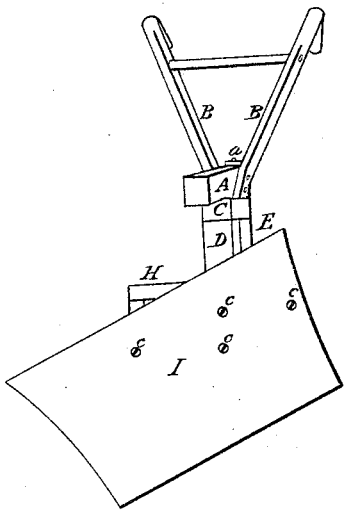
Witnesses:
Frank Smith
R. F. Osgood
Inventor:
James C. Teague
By his atty.
J. S. Brown

UNITED STATES PATENT OFFICE.

JAMES C. TEAGUE, OF CENTRE HILL, MISSISSIPPI.

IMPROVEMENT IN COTTON-SCRAPERS.

Specification forming part of Letters Patent No. 29,924, dated September 4, 1860.

*To all whom it may concern:*

Be it known that I, JAMES C. TEAGUE, of Centre Hill, in the county of De Soto and State of Mississippi, have invented a new and Improved Cotton and Corn Scraper; and I do hereby declare that the following is a full and exact description thereof, reference being had to the accompanying drawings, making part of this specification—

Figure 1 being a plan of the scraper; Fig. 2, a vertical section thereof in the plane indicated by the line $x\ x$, Fig. 1; Fig. 3, a rear view of the scraper; Fig. 4, a front view thereof.

Like letters designate corresponding parts in all the figures.

A beam, A, with handles B B, of ordinary construction, is provided. I make the box G of the scraper of cast-iron in one piece, the size, thickness, and weight being such as to produce the lightest scraper required to be used. The bottom $f$ of the box inclines downward from left to right, while the sides $g\ h$ are vertical, as shown in the drawings. This gives the bottom of the scraper the right shape and inclination without tipping it to one side, thereby preserving the balance of the scraper and rendering it easy to hold.

In order to have the sides of nearly equal weight, the left side, $g$, not being so deep as the right side, $h$, is made thicker, as shown in Figs. 1 and 3. The front of the scraper is open and of a proper shape to receive the share or mold-board I in the right position. The mold-board is secured to the box by screws or bolts $c\ c$, and serves at the same time to close the front end of the box.

The box is secured to the beam A by means of a bar, C, into which a projection, E, from the rear side, $d$, of the box, and a standard, D, extending upward from the bottom $f$ of the box near the front end, are received and suitably fastened. The bar C is then firmly secured to the under side of the beam by screw-bolts $a\ a$. The standards D may either be cast in one piece with the box or attached to it by a screw $b$, as shown in Fig. 2, or otherwise; or it may be in one piece with the bar C.

When it is desired to increase the weight of the scraper, weights, of stones or other material, are to be placed in the box G until the desired weight of scraper is obtained. In like manner the weight may be diminished at pleasure. The weights are readily arranged in the box, so as to preserve the balance of the scraper. The box is covered by a lid, H, which may be of wood.

What I claim as my invention, and desire to secure by Letters Patent, is—

The arrangement and combination of the cast-iron box G, with inclined bottom and balanced sides, bar C, for attaching to the beam, and movable weights to increase or diminish the weight of the scraper and keep it balanced, substantially as herein specified.

In witness that the above is a true specification of my improved cotton and corn scraper I hereunto set my hand this 1st day of May, 1860.

JAMES C. TEAGUE.

Witnesses:
JAMES A. SMITH,
S. P. H. KELSEY.